MULTIAPERTURE-CORE LOGIC CIRCUIT

Filed Dec. 30, 1960 2 Sheets-Sheet 1

INVENTOR
ROBERT BETTS

BY Bernard N. Wiener
ATTORNEY

MULTIAPERTURE-CORE LOGIC CIRCUIT

Filed Dec. 30, 1960 2 Sheets-Sheet 2

United States Patent Office 3,188,480
Patented June 8, 1965

3,188,480
MULTIAPERTURE-CORE LOGIC CIRCUIT

Robert Betts, Vestal, N.Y., assignor to International Business Machines Corporation, New York, N.Y., a corporation of New York Filed Dec. 30, 1960, Ser. No. 79,619
1 Claim. (Cl. 307—88)

This invention relates to multiaperture-core logic circuits and more particularly to a capacitor-coupled multiaperture-core logic circuit in which binary information stored in a condition of a magnetic flux state in a precedent core is transferred to a condition of a mangetic flux state in a subsequent core via the coupling capacitor therebetween.

A useful binary logic circuit has the capability of transferring binary information from one location to a subsequent location. A multiaperture-core has a plurality of isolated regions each of which can be established in either of two flux conditions. Binary information can be stored in at least one of the two conditions. A multiaperture-core logic circuit in accordance with this invention has at least a precedent core and a subsequent core with the capability of transferring stored binary information from the former to the latter.

Heretofore, in a capacitor-coupled multiaperture-core logic circuit the transfer of stored binary information from a condition of a magnetic flux state of a precedent core to a condition of a magnetic flux state in a subsequent core has occurred during charge time of the series coupling capacitor therebetween. In the prior art circuit, it is necessary that the output impedance of the precedent core and the input impedance of the subsequent core be properly matched and the total switching of the flux in each core occur coincidentally to obtain optimum transfer of binary information. In the prior art circuit, if the impedances noted are somewhat mismatched, it is difficult to obtain the transfer of the binary information. The output energy of the precedent core can be increased by a larger driving ampere-turns, thereby decreasing the switching-time. Since the impedance and switching-time of both cores should be matched, the subsequent core will require a higher energy input in order to decrease its switching time. Therefore, the amount of excess energy which can be obtained to insure the switching of the subsequent core is limited. The coupling capacitor of the prior art circuit does not aid the transfer of the binary information but rather acts as an impedance which hinders it. Further, where it is desired to transfer the binary information stored in the precedent core to a plurality of subsequent cores, the requirement for impedance matching severely limits the usage of the prior art circuit.

It is a prime object of this invention to provide a capacitor-coupled multiaperture-core logic circuit in which binary information stored in a precedent core is transferred to a subsequent core during discharge of the coupling capacitor therebetween.

It is another object of this invention to provide a capacitor-coupled multiaperture-core logic circuit in which binary information stored in a precedent core is transferred to a pluralty of subsequent cores during discharge of the coupling capacitor therebetween.

It is still another object of this invention to provide a capacitor-coupled multiaperture-core logic circuit in which the output impedance of a precedent core need not be carefully matched to the input impedance of a subsequent core.

A further object of this invention is to provide a capacitor-coupled multiaperture-core logic circuit in which the switching time of the output magnetic flux of a precedent core need not be equal to the switching time of the input magnetic flux of a subsequent core.

The foregoing and other objects, features and advantages of the invention will be apparent from the following more particular description of a preferred embodiment of the invention, as illustrated in the accompanying drawings.

Figure 5:
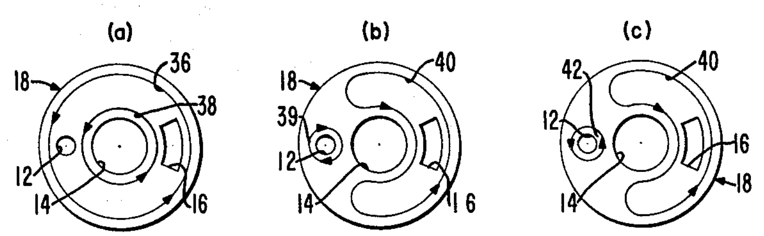

FIGURE 5 provides illustrative magnetic flux conditions in a multiaperture-core suitable for characterizing the operation of this invention.

Figure 6:
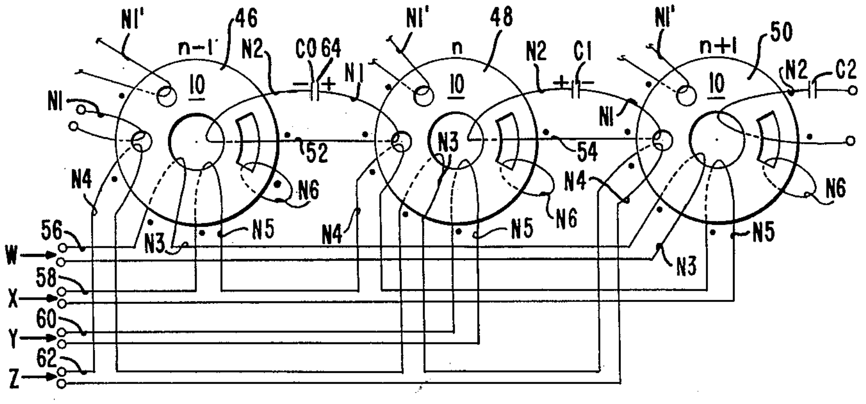

FIGURE 6 illustrates a capacitor-coupled multiaperture-core OR logic circuit in accordance with this invention.

Figure 7:
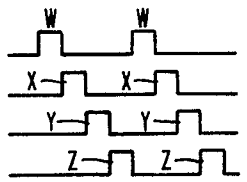

FIGURE 7 illustrates the clock pulse timing curves for the multiaperture-core OR logic circuit of FIGURE 6.

Figures 8, 9:
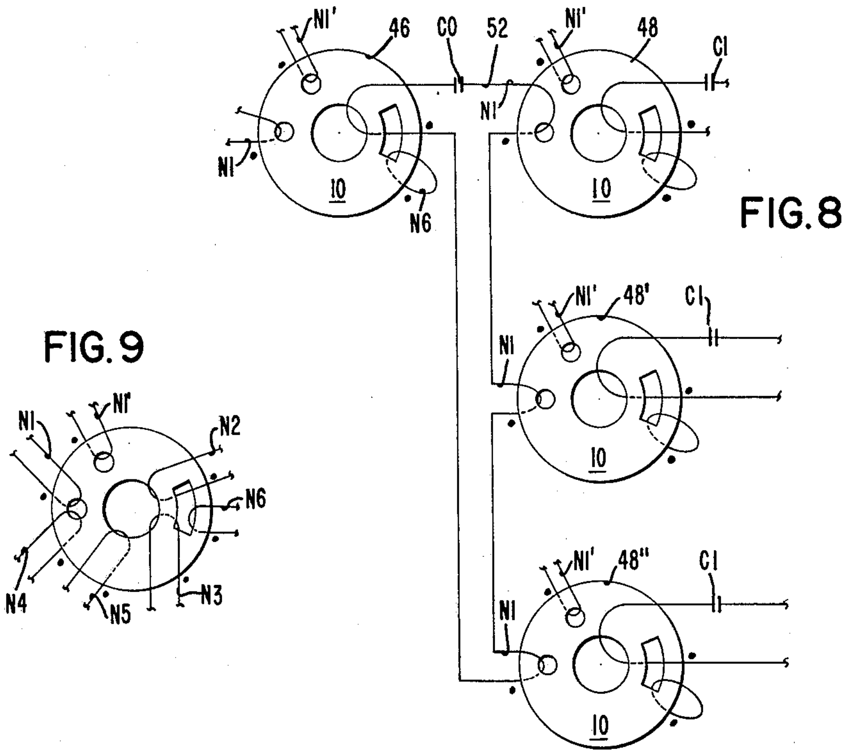

FIGURE 8 illustrates the practice of this invention with branching from a precedent core to a plurality of subsequent cores.

FIGURE 9 illustrates the manner of arranging windings on a multiaperture-core for a variation of the OR logic circuit of this invention.

Broadly, this invention provides a capacitor-coupled multiaperture-core logic circuit in which binary information stored in a precedent core is transferred to a subsequent core during discharge of the coupling capacitor therebetween. The output magnetic flux is switched by a driving ampere-turns on the precedent multiaperture-core which causes a voltage to be induced in its output winding. This causes the capacitor in series with the output winding to charge to a maximum voltage. While the capacitor is charging, the current to the input of the subsequent core is in a direction such that it does not switch magnetic flux therein. During the discharge of the coupling capacitor the input magnetic flux of the subsequent core is switched. Thereafter, the flux conditions of subsequent multiaperture cores are oriented so that the binary information which was present in the output leg of the precedent core is stored in the output leg of the subsequent core.

A multiaperture-core logic circuit may be made to have several desirable properties: (1) multiple inputs, i.e., one or several inputs can transfer binary information into a core; (2) sequential inputs, i.e., the inputs may be simultaneous or sequential; (3) isolation between inputs, i.e., the flux around any input aperture, can be reversed independently of all other input apertures; and (4) isolation between input and output, i.e., the flux around the output aperture can be switched with no coupling to the input windings and the flux around the input apertures can be reversed with no coupling to the output winding.

Figure 2:
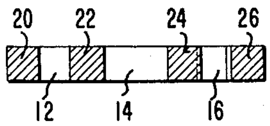
FIGURE 2 is a cross-section of the multiaperture-core of FIGURE 1 taken on the line 2—2 thereof.
Figure 1:
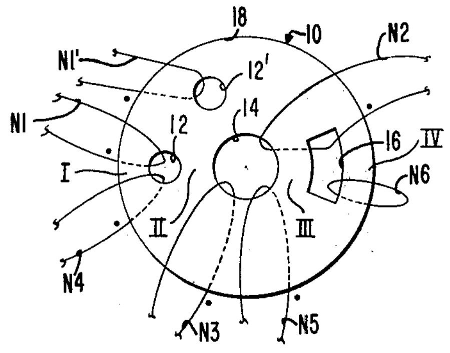
FIGURE 1 illustrates a multiaperture-core suitable for the practice of this invention.

A multiaperture-core suitable for the practice of this invention is shown in FIG. 1 and its cross-section is shown in FIG. 2. The multiaperture-core 10 is a ferrite cylinder having a substantially rectangular hysteresis loop characteristic for each magnetic flux state therein. Multiaperture-core 10 has apertures 12, 14, and 16 therein which establish with each other, and the periphery 18 of core 18 of core 10, legs I, II, III and IV, as will be described. Apertures 12, 14 and 16 have their centers on a major diameter of multiaperture-core 10. Aperture 14 is central to core 10 while apertures 12 and 16 have their centers midway between the periphery 18 of core 10 and the periphery of aperture 14. The circumferential locations of apertures 12 and 16 may be somewhat arbitrary. The sole requirement is that they define legs in the core suitable for the practice of this invention.

Legs I, II, III and IV are established in core 10 as follows: The cross-sectional area 20 between the periphery 18 of core 10 and the periphery of aperture 12 is leg I. The cross-sectional area 22 between the peripheries of apertures 12 and 14 is leg II. The cross-sectional area 24 between the peripheries of aperture 14 and aperture 16 is leg III. The cross-sectional area 26 between the periphery of aperture 16 and the periphery 18 is leg IV. Cross-sectional areas 20, 22, 24 and 26 are equal.

Figure 3:
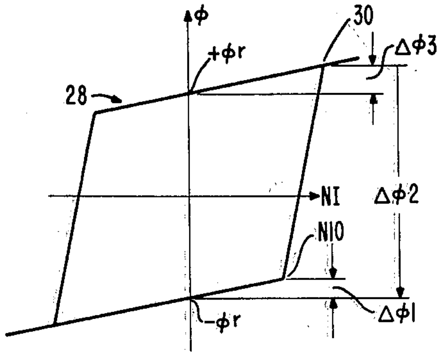
FIGURE 3 is an idealized hysteresis loop suitable for explaining the magnetic flux state of any given cross-section of a multiaperture-core.

An idealized substantially rectangular hysteresis loop 28 for a magnetic flux state of a leg of multiaperture-core 10 is shown in FIG. 3. The total flux in a leg area is the ordinate $\phi$. The driving ampere-turns is the abscissa NI. The two remanent flux conditions for the state are $+\phi r$ and $-\phi r$. The flux is the reset condition in any leg of core 10 when it is at point $-\phi r$. The set state is $+\phi r$. If the flux condition of a leg is at point $-\phi r$, and a positive driving ampere-turns N*Io* is applied to the leg, a small flux change $\Delta\phi 1$ occurs. When the driving ampere-turns sufficiently exceeds N*Io*, the flux condition of core 10 is switched to point 30 with a consequent large flux change $\Delta\phi 2$. If the flux condition of the leg were at $+\phi r$, and the same driving ampere-turns are applied to the leg, a small flux change $\Delta\phi 3$ occurs. The voltage induced in a winding on a leg of core 10 is proportional to the rate of flux change in the leg coupled to the winding. Therefore, the output voltage from a change of the flux condition therein depends upon the magnitude and direction of the applied driving ampere-turns and whether the flux condition is $+\phi r$ or $-\phi r$.

Figure 4:
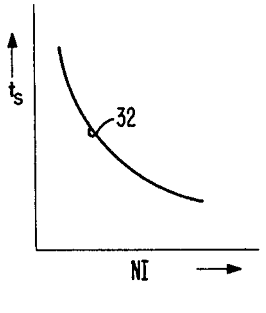
FIGURE 4 is an illustrative curve showing the inverse relationship between the switching-time of a condition of a magnetic flux state of a multiaperture-core and the driving ampere-turns therefor.

FIG. 4 illustrates by curve 32 the inverse relationship between the switching-time $t_s$ of a condition of a magnetic flux state and the magnitude of the driving ampere-turns NI therefor. The states of core 10 are characterized with respect to legs I, II, III and IV.

The various conditions of the core 10 and the manner in which each is obtained will be understood through consideration of FIGS. 1 and 5. A condition is shown as a possible flux path. The illustrative flux paths in FIGS. 5*a*, *b* and *c* will assist in the understanding of this invention.

Input winding N1 encircles leg I via aperture 12 and periphery 18. Output winding N2 encircles leg III via apertures 14 and 16. Drive winding N3 encircles the entire multiaperture-core 10 via aperture 14 and periphery 18. Input reset winding N4 encircles leg I via aperture 12 and periphery 18. Core reset winding N5 encircles the entire multiaperture-core 10 via aperture 14 and periphery 18. Inhibit winding N6 encircles leg IV via aperture 16 and periphery 18. Inhibit winding N6 is a shorted turn which prevents change of flux in leg IV.

According to the convention used herein, current into the dot side of a winding drives the flux in the leg associated therewith toward the reset condition $-\phi r$. The voltage induced in any other winding coupled to the driven winding is positive at its dot terminal, and current flows from a dot of any loaded winding. Current into a non-dot drives the flux toward the set state $+\phi r$. The entire core reset condition shown in FIG. 5*a* results from current applied to the dot of core reset winding N5. Current into the non-dot side of input winding N1 switches the core 10 to the after-input condition shown in FIG. 5*b*. The after-input-reset condition shown in FIG. 5*c* is obtained by applying current to the dot end of input-reset winding N4 with no effect on the remainder of the core.

FIG. 7 is a clock pulse timing diagram for the OR logic circuit in accordance with this invention shown in FIG. 6. The particular flux conditions of core 46 OR logic circuit for the clock pulses W, X, Y and Z will be understood through reference to FIG. 5. The flux paths shown in FIG. 5 are merely illustrative.

FIGURE 5*a* illustrates the magnetic flux condition in multiaperture-core 10 after clock pulse W is applied to core reset winding N5. Flux path 36 traverses legs I and IV and flux path 38 traverses legs II and III in the manner shown, i.e., counterclockwise.

FIG. 5*b* illustrates the magnetic flux paths in multiaperture-core 10 after an input pulse occurs in input winding N1 at input time Y. FIG. 5*b* shows flux path 39 encircling aperture 12 clockwise and flux path 40 encircling aperture 16 counter-clockwise.

FIG. 5*c* illustrates the flux paths in multiaperture-core 10 after input reset occurs via input reset winding N4. Flux path 42 encircles aperture 12 in a counter-clockwise direction and flux path 40 encircles aperture 16 in a counter-clockwise direction.

The clock pulses W, X, Y and Z shown in FIG. 7 are a plurality of sequential pulses which define a timing period for the OR logic circuit of FIG. 6.

FIG. 6 presents an OR logic circuit in accordance with this invention. Sequential cores 46, 48 and 50 are coupled via capacitor circuits 52 and 54, respectively. Capacitor circuit 52 encircles leg III of core 46 and leg I of core 48. Capacitor circuit 54 encircles leg III of core 48 and leg I of core 50. Clock pulse W energizing line 56 energizes drive winding N3 of cores 46 and 50. Clock pulse X energizing line 58 energizes core-reset winding N5 of core 46, input-reset winding N4 of core 48, and core-reset winding N5 of core 50. Clock pulse Y energizing line 60 energizes core-reset winding N5 of core 48. Clock pulse Z energizing line 62 energizes input-reset winding N4 of cores 46 and 50, and drive winding N3 of core 48. It is assumed that cores 46 and 50 are in the input-reset condition shown in FIG. 5*c* and core 48 is in the reset condition shown by FIG. 5*a*. Cores 46 and 50 are defined as being in the "1" state and core 48 is defined as being in the "0" state. A current pulse at clock time W on clock pulse W energizing line 56 resets cores 46 and 50 establishing a counter-clockwise current in capacitor coupling circuit 52 thereby charging capacitor 64. Since core 48 is in the reset condition, the charging current has no effect thereon. Further, cores 46 and 50 will have no voltage generated across their input windings N1 since the flux is already in the reset direction in leg I. When the output voltage from core 46 becomes smaller than the voltage on input capacitor 64, current in capacitor circuit 52 reverses and switches core 48 to the condition of FIG. 5*b*.

The particular timing arrangement for the OR logic circuit of FIG. 6 is now presented another way. Assume cores $(n-1)$ and $(n+1)$ are in the input-reset condition (FIG. 5*c*) and core $n$ is in the reset condition (FIG. 5*a*). Cores $(n-1)$ and $(n+1)$ are in the "1" state and core $n$ is in the "0" state. A current pulse at clock time W resets cores $(n-1)$ and $(n+1)$ and charges capacitor C*o* as shown. The charging current has no effect on core $n$ since it is already in the reset condition. Cores $(n-1)$ and $(n+1)$ have not voltage across their input windings since the flux is already in the reset condition in leg I. When the output voltage from core $(n-1)$ becomes smaller than the voltage on capacitor C*o*, the current in circuit 52 reverses and switches core $n$ to the FIG. 5*b* condition and charges C1. Capacitor C1 loads core $n$ during the initial switching but aids in completing the switching of leg III when it discharges. Since the core $(n+1)$ is being driven and thereby is being held in the reset condition by the W pulse, the charging and discharging of capacitor C1 has no effect on core $(n+1)$. The shorted inhibit winding N6 prevents any flux change in leg IV.

A pulse at clock X holds cores $(n=1)$ and $(n+1)$ in the reset condition while switching core $n$ to the input reset condition. Core $(n-1)$ is held in the reset state while leg I, of the core $n$ is being reset so that no back transfer will occur. A clock pulse at Y time now resets core $n$ and charges C1 so that core $(n+1)$ is in the condition shown by FIG. 5$b$ when capacitor C1 discharges. The pulse at clock Z resets leg I of cores $(n-1)$ and $(n+1)$ while holding core $n$ in the reset condition. If no input is present at input time, a core remains in the reset condition during all clock pulses.

The manner in which the invention hereof transfers binary information to a plurality of branched circuits will be understood through reference to FIG. 8. Identification numerals are as for FIG. 6 where applicable. The timing of the circuit of FIG. 8 is as for FIG. 7. The capacitor coupling winding 52 is shown threading subsequent cores 48, 48′ and 48″. The input pulse to N1 of core 46 which causes a transfer of binary stored information from core 46 to core 48 also causes the transfer of the same binary information to cores 48′ and 48″.

FIG. 9 illustrates multiaperture core and windings suitable for a variation of the OR logic circuit of FIG. 6. In comparison with FIG. 1, the core and windings are identical except for drive winding N3 and inhibit winding N6. Drive winding N3 encircles leg III via apertures 14 and 16. It switches the flux in legs III and IV during drive time. The inhibit winding N6 is pulsed when the core is receiving an input to prevent flux switching in leg IV. Input reset or winding N4 switches flux around aperture 12 and drive on winding N3 switches flux around aperture 16, and they can occur simultaneously. Therefore, the core can receive an input and give an output at successive clock times.

While this invention has been particularly shown and described with reference to a preferred embodiment thereof, it will be understood by those skilled in the art that the foregoing and other changes in form and details may be made therein without departing from the spirit and scope of the invention.

What is claimed is:

An OR logic circuit comprising, in combination: a first and a second multiaperture-core with input states and output states, each of said cores having a substantially rectangular hysteresis loop characteristic, said states being determined by the remanant magnetic flux condition around a first and second aperture in said core, respectively, representative of stored binary information; each said core having first, second, third and fourth legs defining respective cross-sectional areas of the core associated with the first and second apertures and a third aperture in said core, each said core having an input winding on said first leg, an input-reset winding on said first leg, a drive winding on the second leg magnetically enclosing the second opening and the periphery of said core, a core-reset winding on said second leg, an inhibit winding on said fourth leg and an output winding on said third leg; clock pulse timing means providing sequential first, a second, third and fourth clock pulses, said first clock pulse being applied to said drive winding on said first core, said second clock pulse being applied to said core-reset winding on said first core and said input-reset winding on said second core, said third clock pulse being applied to said drive winding on the second core and said fourth cock pusle being applied to said input-reset winding on said first core and said core-reset winding on said second core; a series capacitor circuit coupling said third leg of said first core to said first leg of said second core; means to store a particular binary bit of information in said third leg of said first core; said clock pulse means transferring said binary information to said second core during discharge of said coupling capacitor therebetween.

References Cited by the Examiner

UNITED STATES PATENTS

| | | | |
|---|---|---|---|
| 2,847,659 | 8/58 | Kaiser | 340—174 |
| 2,852,699 | 9/58 | Ruhman | 307—88 |
| 2,889,542 | 6/59 | Goldner et al. | 340—174 |
| 2,911,628 | 11/59 | Briggs et al. | 340—174 |
| 2,968,795 | 1/61 | Briggs et al. | 340—174 |
| 3,027,545 | 3/62 | Kodis | 340—174 |

OTHER REFERENCES

6/59, Publication I: RCA Technical Notes, No. 254, 2 sheets.

IRVING L. SRAGOW, *Primary Examiner.*

STEPHEN W. CAPELLI, *Examiner.*